Jan. 3, 1933.  F. W. KELLY ET AL  1,892,955
PASTEURIZING APPARATUS
Filed Dec. 9, 1929  4 Sheets-Sheet 1

Inventors
Frank W. Kelly and
Alex H. Luedicke
By
Bottum, Hudnall, Lecher, McNamara and Michael
Attorneys Jan. 3, 1933.   F. W. KELLY ET AL   1,892,955
PASTEURIZING APPARATUS
Filed Dec. 9, 1929   4 Sheets-Sheet 2

Inventors
Frank W. Kelly and
Alex H. Luedtke
By
Bottum, Hudnall, Lecher, McKenna and Michel
Attorneys

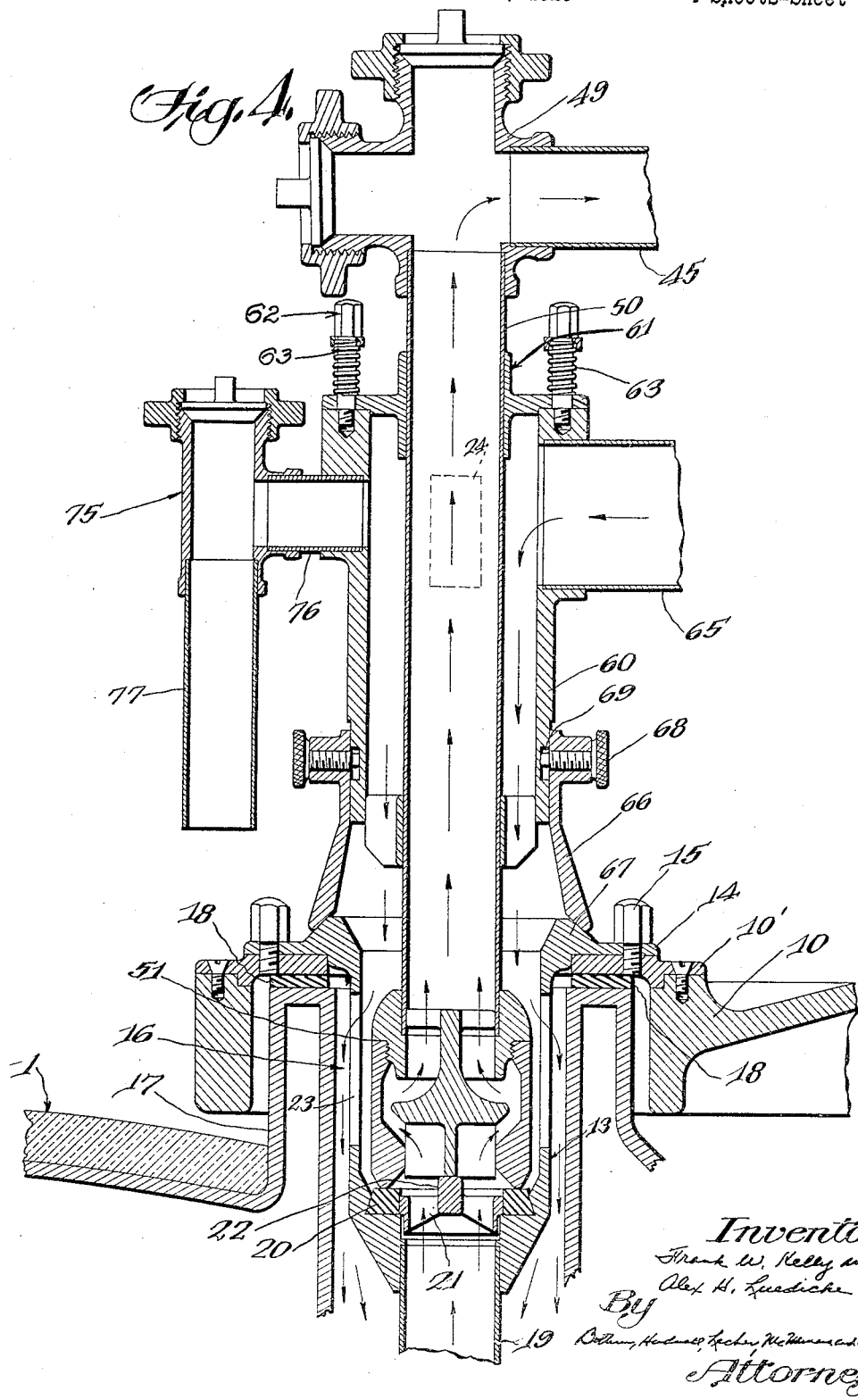

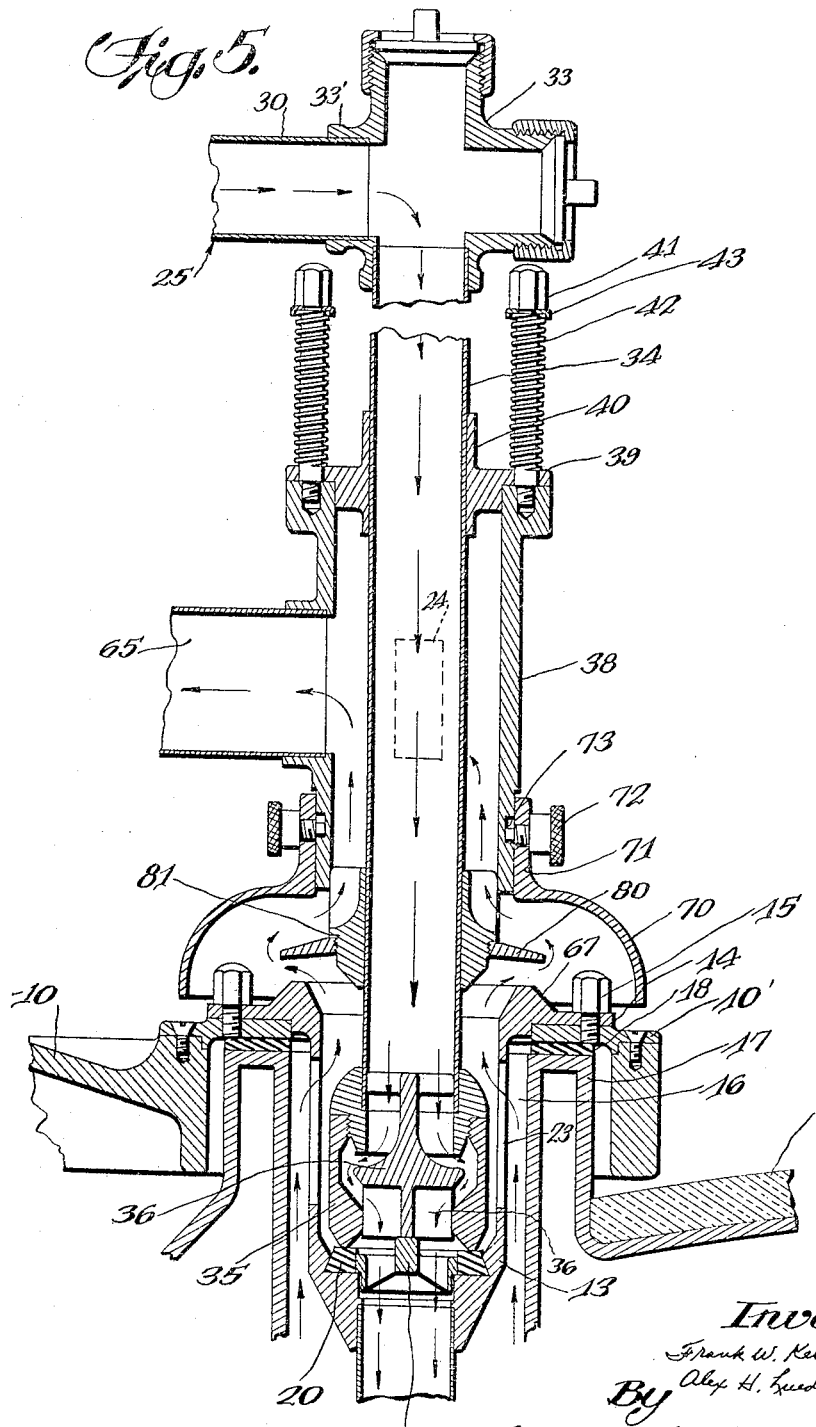

Patented Jan. 3, 1933

1,892,955

UNITED STATES PATENT OFFICE

FRANK W. KELLY AND ALEX. H. LUEDICKE, OF MILWAUKEE, WISCONSIN, ASSIGNORS TO GRIDLEY DAIRY COMPANY, INCORPORATED, OF MILWAUKEE, WISCONSIN, A CORPORATION OF DELAWARE

PASTEURIZING APPARATUS

Application filed December 9, 1929. Serial No. 412,640.

This invention relates to improvements in pasteurizing apparatus particularly adapted for use with milk, cream, and other liquids, and of the type forming the subject matter of our patent for pasteurizing apparatus, dated December 10, 1929, No. 1,738,834.

In the patent referred to, several modified forms of a pasteurizing apparatus are shown and described. In all forms the apparatus includes a plurality of individual holding tanks, each of which has an interior stationary pipe, the upper end of which is adapted to function as a coupling member and the lower end of which discharges into a depression at the center of the bottom of the holding tank. The tanks are filled and emptied of the liquid by means of filling and emptying arms, each of which has a downturned outer end formed with a coupling member. In the operation of this pasteurizing apparatus the filling and emptying arms are moved up and down vertically and are also rotated, the rotary movement permitting the arms to co-operate successively with the various tanks and the vertical movement permitting the arms to be raised and lowered through openings in the top of the tanks so that their coupling members may make interior operative connections with the coupling members of the stationary pipes of the tanks which they serve. The advantage of the interior operative connection resides in the fact that the connection is made in the heated area where a pasteurizing temperature is maintained. Pasteurizing apparatus of the application referred to also discloses several types of means for transferring the heated air from the chamber being filled to the chamber being emptied so that when any tank is connected with the emptying arm warm air will be supplied to the interior thereof.

The present invention is concerned with certain improvements in the heated air transferring means employed between the tank being filled and the tank being emptied, these improvements acting to carry out this transfer of the heated air or the supply of warm air to the tank being emptied while precluding any possibility of foam, milk, or the like, being carried over from the tank being filled to the tank being emptied and preventing any condensate formed in the air transferring means from finding its way into either tank. In general, the present invention, in this respect, is concerned with the absolute prevention of any mixture of unheld milk or liquid containing bacterial growth with pasteurized milk under all circumstances and conditions.

Another important object of the invention is to provide a novel cover arrangement for automatically closing the openings in the tanks in which the milk is being held during the time that the other tanks are being filled and emptied respectively.

A further important object of the invention resides in the provision of a novel heating means for the individual tanks which serves to maintain the inner surfaces of the upper part of the tank, that is, the underside of all parts of the top of the tank and the upper portion of the inner peripheral wall thereof at a pasteurizing or sterilizing temperature thereby precluding bacterial growth in any condensate that might deposit or form on said surface and maintaining the air above the liquid at or above the required pasteurizing temperature; and all of this without too highly heating the portions of the inner surfaces contacting with the liquid.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 4 is a fragmentary view in diametrical vertical section on an enlarged scale showing the tank emptying arm and illustrating the manner in which it coacts with the opening in the tank and the coupling member on the upper end of the stationary pipe therein;

Figure 5 is a view similar to Figure 4 but illustrating the tank filling arm.

Figure 1:
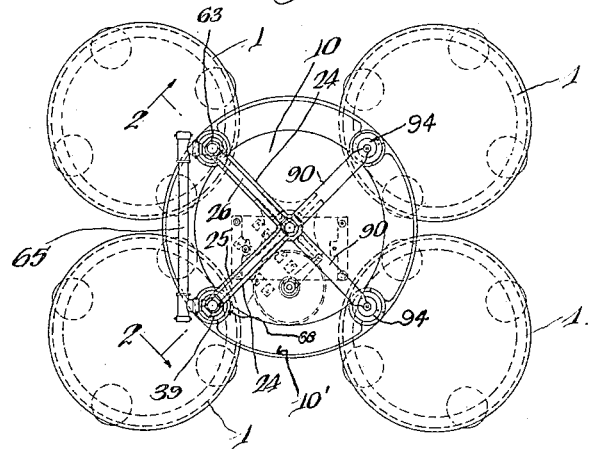
Figure 1 is a diagrammatic plan view showing a pasteurizing apparatus embodying the present invention.

Referring to the drawings, the numeral 1 designates the holding tanks of which four are shown (see Figure 1). Each tank 1 is of jacketed or double walled construction to provide a heating or steam space 2 which extends not only around the body and bottom of the tank but also around the top thereof. A covering of heat insulating material designated at 3 is provided for the entire tank. Steam is supplied to the steam spaces 2 from any suitable source and through connections or fittings 4 (see Figure 2) which extend through the top of the tank. The body of the tank has a valve 5 connected thereto at an appropriate level, the valve 5 controlling the communication of the space 2 with the atmosphere and being similar to the ordinary and well known type of radiator valve. In other words, the valve 5 is thermostatically controlled and permits the escape of air or fluid from the space 2 until the temperature of such air or fluid reaches a predetermined point whereupon the thermostat of the valve operates to close the same and cut off further escape of fluid from the space 2. In the present instance, the steam supplied through the fitting 4 will displace air and the air will flow out through the valve 5. When the steam extends down in the jacket to the valve 5 it heats up the thermostat of the valve and closes the valve proper thereby preventing escape of steam. In this way the undersurface of the top is kept at a sterilizing or pasteurizing temperature as desired and the air above the liquid in the tank is appropriately heated and yet the main body of the tank is not excessively heated.

In between the tanks 1, a central supporting member 10 is provided and is common to all of the tanks 1, the supporting member having adjustable feet 11 resting on brackets or lugs 12 secured to the tanks 1. At spaced points about the peripheral portion of the supporting member 10, which peripheral portion may be in the form of a removable annular plate 10' (see Figures 4 and 5), coupling members designated generally at 13 are provided, each coupling member 13 having a flanged upper end 14 resting on the plate 10' and secured thereto by bolts 15. The body of each coupling member 13 projecting down through an opening in the plate 10' and through an opening 16 in the underlying tank. As shown in Figures 4 and 5, each tank has an opening 16 through which it is filled and emptied, the opening being surrounded by an upstanding neck 17. This neck 17 is hollow and in communication with the interior of the steam space 2 so that it is heated. In order to transfer the heat from the neck 17 to the plate 10' of the central supporting member 10, washers 18 of heat conducting material are provided between the upper ends of the neck 17 and the adjacent portions of the plate 10'. The lower end of each coupling member 13 communicates with and is connected to a stationary pipe 19 which extends downwardly through the tank and terminates in a depression $1^a$ formed at the center of the bottom of each tank. At a point well within each tank and immediately adjacent the connection of the pipe 19 with the coupling 13 a gasket 20 is secured to the interior of the coupling member 13 and provides a seat against which the cooperable coupling member of a tank filling or emptying arm is engageable as will be hereinafter more fully described. Within the gasket 20 a spider 21 is provided and has its central portion extended upwardly as at 22 to provide a valve opening member as will later more clearly appear. The upper end of the coupling member 13 is open and the body thereof is formed with a plurality of longitudinally extending and angularly spaced slots 23 to permit air passing into and out of the tank to traverse the coupling member 13.

Mounted on the central supporting member 10 for raising and lowering and rotating movement is a filling arm designated generally at 25 and an emptying or suction arm designated generally at 26. The arms 25 and 26 are entirely separate and isolated from each other so far as internal communication is concerned but they are structurally connected so as to be constrained to rotate and move up and down as a unit by means of a spider or frame designated generally at 23 and having a hub 24' supported for rotation and raising and lowering movement at the center of the supporting member 10 and having spaced radial spider arms 24 integral therewith or otherwise suitably fixed thereto. Any suitable means may be employed for rotating and raising and lowering spider 23 and consequently the filling and suction arms carried thereby and such a means is shown generally at 28 in Figure 2 and comprises a motor and suitable timing and motion transmission mechanism. For a complete disclosure of one type of mechanism suitable for this purpose, reference is made to our copending application above referred to.

Figure 2:
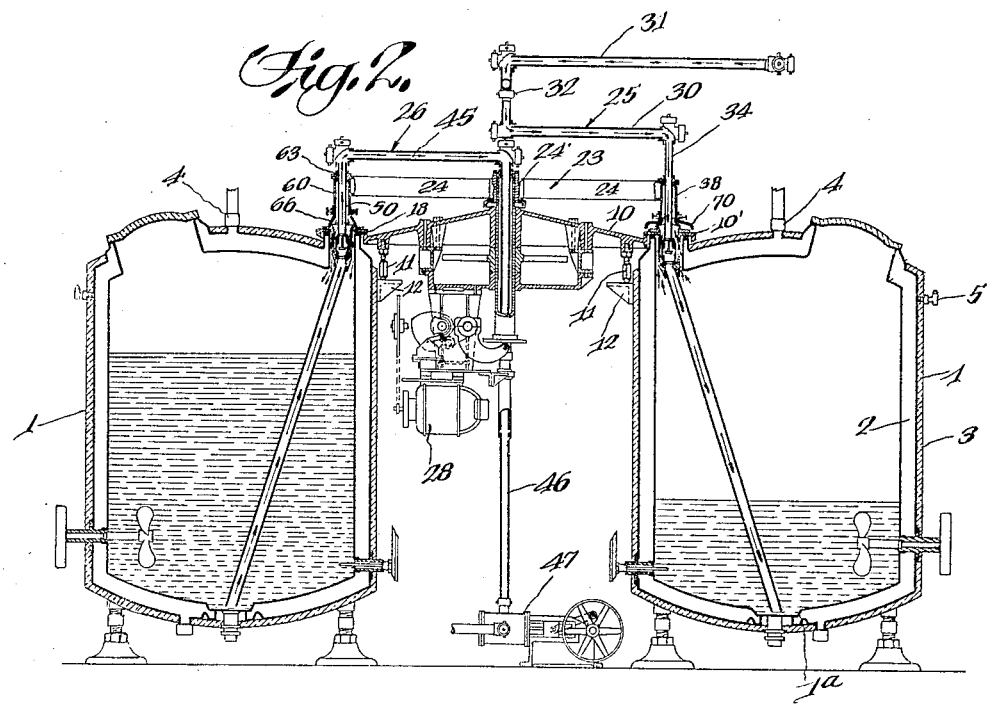
Figure 2 is a view partly diagrammatic and partly in transverse vertical section illustrating one of the tanks being filled while the other is being simultaneously emptied.
Figure 3:
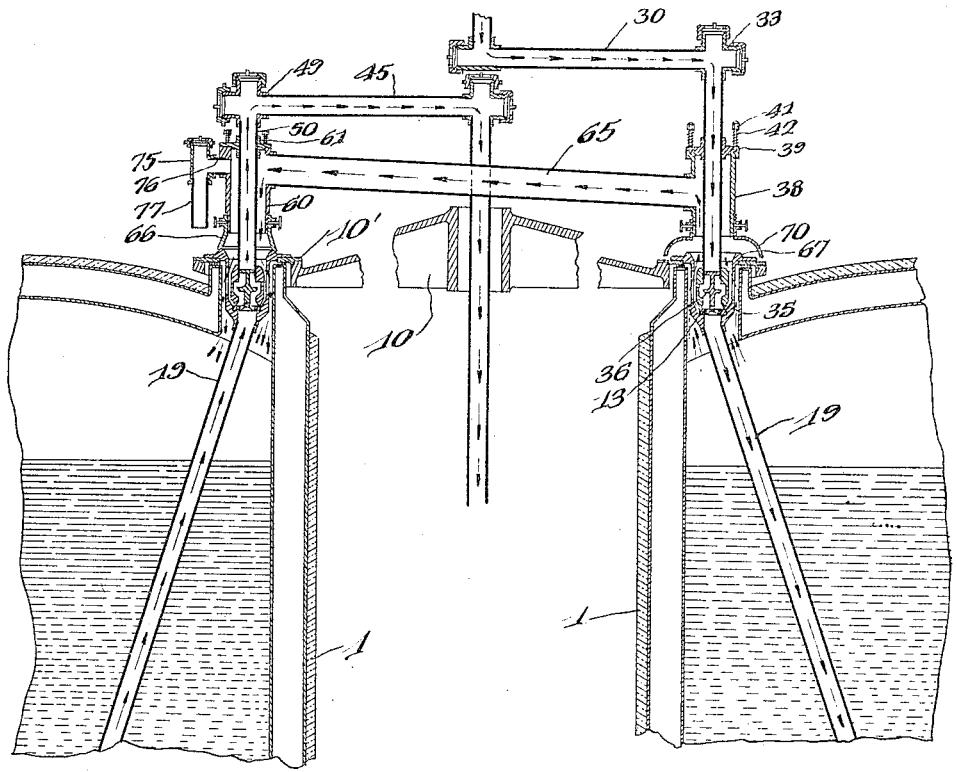
Figure 3 is a fragmentary view similar to Figure 2 but showing the air transferring pipe for conducting the heated air from the interior of the tank being filled to the interior of the tank being emptied.
Figure 6:
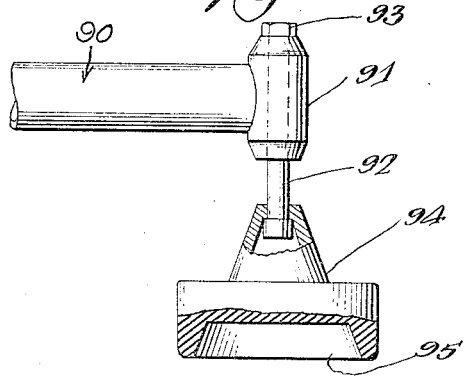
Figure 6 is a fragmentary detail view partly in elevation and partly in vertical section showing one of the covers employed.

The filling arm 25 is shown to advantage in Figures 2, 3 and 5 and, as illustrated, comprises a radially and horizontally extending pipe section 30 having one end connected to a milk supply pipe 31 through a swivel connection 32 and having its other end threaded into a nipple 33' of a fitting 33. The fitting 33 is connected to the upper end of the vertical filling arm section 34, the lower end of which carries a valved coupling member 35 adapted to engage and having liquid tight connection with the gasket 20 of the coupling member 13 of each tank. In the coupling member 35 a check valve 36 is provided and, though biased by its own weight to normally seated or closed position, is opened by the action of the valve opening projection 22 of the spider 21 of the coupling 13 when the couplings 35 and 13 are engaged since at such time the projection 22 engages the guiding spider 36' of the valve 36 and lifts the latter off of its seat. The arm of the frame or spider 23 provided for the filling arm 25 has a hollow head 38 fixed to and supported on the outer end thereof and this head 38 surrounds the vertical pipe section 34 of the filling arm. At its upper end the head 38 engages beneath the flange 39 of a collar 40, which collar 40 is snugly fitted on and suitably secured to the vertical filling arm section 34. Bolts 41 pass through openings in the flange 39 and are threaded into the upper end of the head 38. Encircling the bolts 41 are coil springs 42, the lower ends of which engage the flange 39 and the upper ends of which engage washers 43 abutting against the heads of the bolts 41. With this arrangement, when the motor 28 acts through the gearing 29 to lower the filling arm into any tank and engage the coupling members 13 and 35 the movement is transmitted through the head 38 and consequently through the bolts 41 and springs 42 to the filling arm. The springs 42 may yield slightly to insure proper engagement of the coupling members 35 and 13.

The suction arm (see Figure 4) is similar to the structure of the filling arm as thus far described in that it is made up of a horizontally disposed and radially extending pipe section 45, the inner end of which is connected to the discharge line 46 of a pump 47 (see Figure 2). The discharge line is made up of telescoping sections to permit of the raising and lowering movements. The outer end of the section 45 of the suction or emptying arm 26 is connected with a cross coupling or fitting 49 which in turn connects to a vertical pipe section 50 of the suction arm. The lower end of this vertical section 50 carries a valved coupling 51 similar in all respects to the valved coupling 35 of the filling arm. The vertical section 50 of the suction arm also extends through a hollow head 60 provided at the outer end of its arm 24 of the main supporting spider 23 and has a spring connection with the head 60 including a flanged collar 61, bolts 62 and springs 63.

With the arrangement as thus far described while milk is being held in two of the tanks, one of the other tanks is being emptied and the other is being filled, this being accomplished by bringing the suction and filling arms over the openings of the tank and lowering them down through such openings until the coupling members 35 and 51 coact with the coupling members 13 to establish an interior connection or coupling between the suction and filling arms and the stationary pipes 19 in the tanks. This connection or coupling is effected within the tank and lies within the heated area or within the area maintained at pasteurizing temperature whereby any possibility of contamination is precluded.

The invention further contemplates the transferring of the heated air from the tank being filled to the tank being emptied and this, without any possibility of foam or milk being transferred from one tank to the other or of condensate in the air transferring means finding its way back into either tank. In carrying out this latter purpose an inclined air transferring pipe 65 is provided and connects the hollow heads 38 and 60 (compare Figures 3, 4 and 5). The pipe 65 may be covered with heat insulating material or a steam jacket as described in our copending application above mentioned. The end of the air pipe 65 connected with the filling arm 25 is lower than the end connected with the suction arm so that any condensation which might form on the inner wall of the pipe will flow by gravity back to the head 38. The head 60 of the suction arm 26 (see Figure 4) carries a coupling cap 66, the lower end of which is beveled to coact with a beveled seat 67 provided on each coupling 13. The cap 66 has a loose connection with the head 60 provided by means of screws 68 formed at their inner ends with smoothed reduced extensions engaged in slots 69 provided in the head 60. This loose connection permits limited movement of the cap 66, sufficient, however, to provide an approximately or practical air tight connection between the head 60 and the coupling 13.

The head 38 of the filling arm 25 (see Figure 5) carries a bell or shield 70 which flares outwardly and downwardly and terminates at a point below the seat 67 of the coupling 13. The bell 70 has a cylindrical neck 71 loosely connected to the head 38 by screws 72 and slots 73.

With this arrangement, when one of the tanks is being filled the heated air therein is displaced by milk supplied to said tank and rises upwardly through the slots 23 of the coupling 13 and up through the interior of the coupling and into the bell 70. While the bell is open at the bottom it has been found that the heated air will not flow down out of the bell but will continue up through the bell and pass up into the head 38 and thence through the transfer pipe 65 to the head 60. The sealing bell 70 functions to prevent transfer of milk or foam from one tank to the other for while this bell 70 is sufficient to provide a defined path for the heated air it does not provide such a path for foam or milk, which, being much heavier, will, when rising up over the seat 67, fall down through the open lower end of the bell and pass on to the exterior. The bell is usually sufficient alone to prevent the foam or milk from passing up into the air transfer pipe but its function may be augmented if desired by means of a deflector plate 80 located within the bell and conveniently supported on a spider 81 secured to the vertical section 34 of the filling arm.

As the head 60 is connected to a tank being emptied of its milk the slight rarefaction caused in this way will tend to exert a very slight pull on the heated air supplied to the head 60 which pull is sufficient to carry the heated air from the head 60 down into the tank being emptied. There is rather a delicate balance of conditions producing this operation but this balance obtains under all normal conditions and insures proper transfer of heated air from the tank being filled to the tank being emptied. This travel of the air from the head 60 down into the tank being emptied occurs notwithstanding the provision of a vent designated generally at 75 on the head 60. The vent 75 has a horizontal section 76 connected with the head 60 near its upper end and has a vertical leg 77, the upper end of which communicates with the horizontal section 76 but which is otherwise closed. The lower end of the leg 77 communicates, however, with the atmosphere. This leg 77 is of sufficient length as to operate as a shield and effectively exclude the cold air under normal operating conditions, for the cold air being heavier will not rise up through this leg 77 and displace the heated air being constantly supplied to the upper end thereof and passing down into the tank being emptied. In the event that this suction increases beyond a certain value, then the air will be pulled in through the vent 75 and this is desirable inasmuch as it precludes pulling of milk or liquid through the transfer pipe 65 and from the tank being filled to the tank being emptied, even though there should be such a rush of foam or milk up from the tank being filled as the cause the foam or milk to pass the bell 70 and travel up into the head 38 or pipe 65.

From the foregoing it will be understood that in any phase of the operation one of the four tanks is being filled while another is being emptied. The other two tanks are acting during such time to hold the milk to effect pasteurization. It is desirable, of course, to close the openings 16 leading into such other two tanks during the time the milk is being held and for this purpose the main supporting spider which is raised and lowered with the suction and filling arms also carries cover arms 90, each of which has a tubular bearing 91 at its outer end. In each tubular bearing a cover supporting rod 92 is slidably fitted although limited in its downward movement by a head or collar 93 provided on the upper end thereof and engageable with the upper end of the bearing 91. The lower end of each rod 92 is loosely interconnected with a heavy cover 94, the undersurface of which has a beveled recess 95 adapted to snugly fit the seat 67 of the coupling 13 of any tank. With this arrangement the pair of covers 94 provided serve all of the tanks when it is necessary and desirable to employ a cover for the reason that these covers are carried by the main supporting spider and consequently are moved around from tank to tank as the suction and filling arms are so moved.

Any condensation that occurs in the pipe 65 will tend to flow by gravity back to the head 38 of the filling arm and dripping down through the head 38 will strike the deflector 80 and thus be required or constrained to move to the exterior and will not reach the interior of the tank being filled.

The invention claimed is:

1. A pasteurizing apparatus including a plurality of holding tanks, means for emptying one of said tanks and simultaneously filling another of said tanks and including suction and filling arms adapted to have interior operative connections with the tanks and means for transferring heated air from the interior of the tank being filled to the interior of the tank being emptied, said means including an air transferring pipe connected at its ends to the tanks being filled and emptied and provided with a shielded opening leading to the exterior so that a defined heated air transferring passage is provided and yet foam or milk reaching said passage will be carried to the exterior and will not be transferred from one tank to the other.

2. A pasteurizing apparatus comprising a plurality of holding tanks, means for filling one of the tanks and emptying another, an air transferring conduit provided with means for establishing connection with the tanks being filled and emptied above the liquid level in said tanks, said conduit having means for preventing foam or liquid from flowing therethrough from one tank to the other.

3. A pasteurizing apparatus comprising a plurality of holding tanks, means for filling one of the tanks and emptying another and including suction and filling arms having interior operative connection with the tanks, and means for transferring heated air from a tank being filled to a tank being emptied and including an air transferring pipe carried by said arms and provided with means for establishing connection with the tanks being filled and emptied and having a sealing bell operable to define a passage for the heated air but opening to the exterior to deflect foam and milk to the exterior and away from the transferring pipe.

4. A pasteurizing apparatus including a plurality of holding tanks, means for filling one tank and emptying another and including a suction arm and a filling arm, means supporting said suction and filling arms for successive engagement with said tanks and covers carried by said supporting means and cooperable with the tanks not engaged by the suction and filling arms.

5. In a pasteurizing apparatus, a plurality of liquid holding tanks, mechanically operated tubular arms successively movable into and out of pairs of said tanks for filling one of a pair of tanks and emptying the other tank, means for transferring hot air from the tank being filled to the tank being emptied, and a shielded vent for said hot air transferring means acting to constrain the heated air to travel through the hot air transferring means under normal conditions and acting to prevent foam or liquid from being transferred from one of said tanks to the other.

6. A pasteurizing apparatus including a holding tank, means for filling and emptying said tank and means for supplying heated air to said tank when it is being emptied, said last named means having a shielded opening acting to constrain the heated air to pass into the tank but preventing the travel of foam or liquid through said last named means.

7. A pasteurizing apparatus including a plurality of holding tanks, means for filling one tank and emptying another and including a suction arm and a filling arm, a spider for supporting and moving said arms and having hollow heads surrounding portions thereof, means for establishing communication between the hollow heads and the tanks being filled and emptied and an air transferring pipe connecting said hollow heads, there being a vent to prevent the transfer of foam or liquid through said transferring pipe.

8. A pasteurizing apparatus including a plurality of holding tanks, means for filling one tank and emptying another and including a suction arm and a filling arm, a spider supporting and moving said arms, and a yieldable connection between each arm and its spider.

9. A pasteurizing apparatus including a plurality of holding tanks, means for filling one tank and emptying another and including a suction arm and a filling arm, a spider for supporting and moving said arms and having hollow heads surrounding portions of said arms, an air transferring pipe connecting said hollow heads, means including a sealing bell for establishing a path for heated air between the head surrounding the filling arm and the tank being filled while preventing the flow of milk or foam through said air transferring pipe, and means including a sealing cap for establishing a path for the heated air between the hollow head surrounding the emptying arm and the tank being emptied.

10. A pasteurizing apparatus including a plurality of holding tanks, means for filling one tank and emptying another and including a suction arm and a filling arm, a spider for supporting and moving said arms and having hollow heads surrounding portions of said arms, an air transferring pipe connecting said hollow heads, means for defining a path for heated air between the tank being filled and the head surrounding a portion of the filling arm, and means for defining a path for heated air between the tank being emptied and the head surrounding a portion of the suction arm, said last named head having a vent including a horizontal section connected with the head and a vertical leg depending from said horizontal section.

11. A pasteurizing apparatus including a plurality of tanks, means for filling one tank and emptying another and including a suction arm and a filling arm, a spider for supporting and moving said arms and covers carried by the spider and automatically cooperable with the tanks not engaged by the suction and filling arms.

12. A pasteurizing apparatus including a holding tank having an opening, means for filling and emptying said tank including suction and filling arms adapted to have interior operative connection with the tank at the proper time, means for supporting and moving said suction and filling arms into and out of engagement with the tank and a cover carried by said means and automatically closing the opening into the tank during the holding period.

13. A pasteurizing apparatus including a plurality of holding tanks, each having an opening, a central supporting member common to the tanks and having openings registering with the openings of the tank, a plurality of coupling members, one for each of the tank openings, each coupling member being secured to and supported by said central supporting member and having a seat located within the heated area of its tank, a pipe leading from each coupling member to the bottom of the tank, means for emptying one of said tanks and simultaneously filling another and including suction and filling arms, each of said arms having a valved coupling member at its lower end adapted to cooperate with the seats of the coupling members of the tanks, means for raising and lowering and rotating said arms to cause them to successively cooperate with the tanks and to have interior operative connections therewith, the coupling members of the tanks having openings above the seats thereof and means associated with the suction and filling arms for establishing a defined path for heated air between the coupling members of the tanks engaged by the suction and filling arms.

14. A pasteurizing apparatus including a plurality of tanks, means for filling one tank and emptying another and including a suction and a filling arm, means for supporting and moving said suction and filling arms to cause them to successively coact with pairs of tanks, and covers moved with the arms and operable to automatically close the tanks during the holding period.

15. A pasteurizing apparatus including a plurality of tanks, means for filling one tank and emptying another and including a suction arm and a filling arm, means for causing said arms to successively coact with pairs of tanks, an air transferring pipe carried by said arms and inclining upwardly from the filling arm to the emptying arm, means for connecting the ends of said pipe to the interiors of the tanks being filled and emptied and including a sealing bell adjacent the tank being filled, and a deflector positioned within said sealing bell to augment the function thereof and to deflect any condensation to the exterior.

In witness whereof, we hereto affix our signatures.

FRANK W. KELLY.
ALEX. H. LUEDICKE.